Sept. 9, 1924.
J. E. CHAUVIN
1,508,217
ANIMAL TRAP
Filed Aug. 20, 1923      3 Sheets-Sheet 1
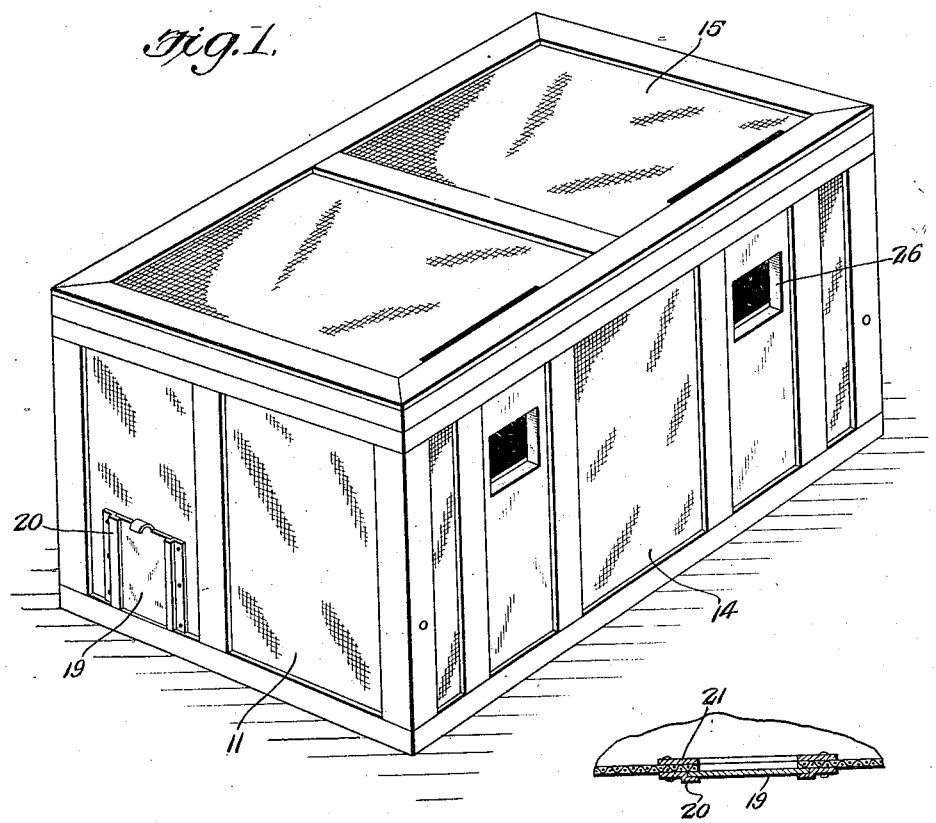
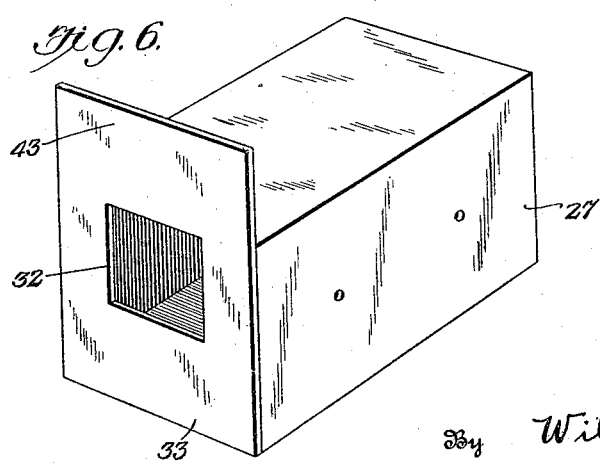
Inventor
J.E.Chauvin,
By Wilkinson & Giusta
Attorneys.

Sept. 9, 1924.　　　　　　　　J. E. CHAUVIN　　　　　　　1,508,217
ANIMAL TRAP
Filed Aug. 20, 1923　　　3 Sheets-Sheet 2
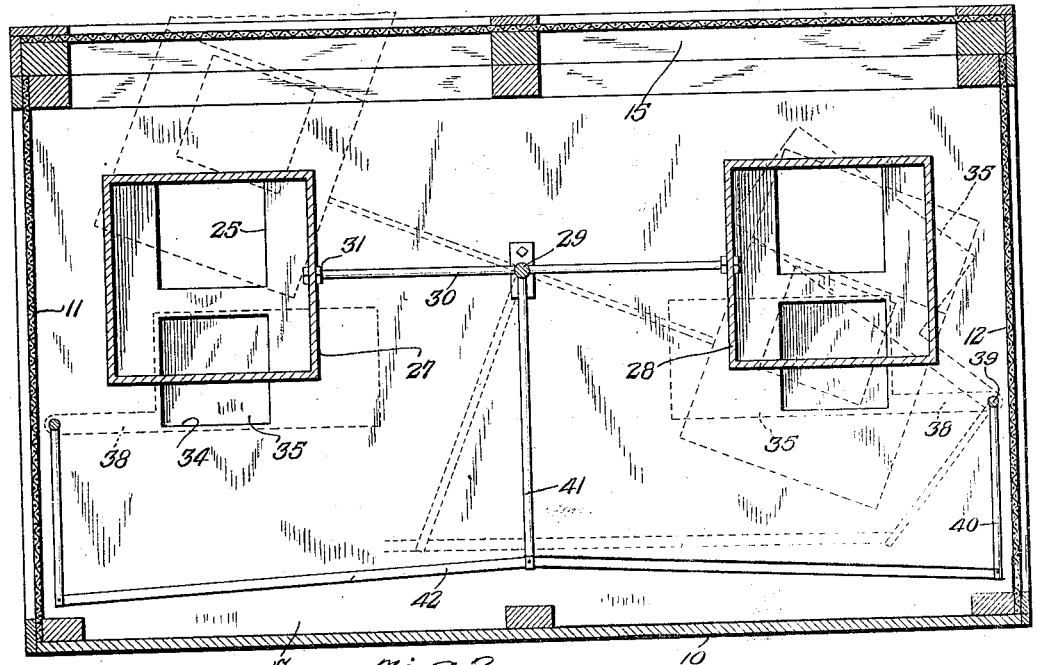
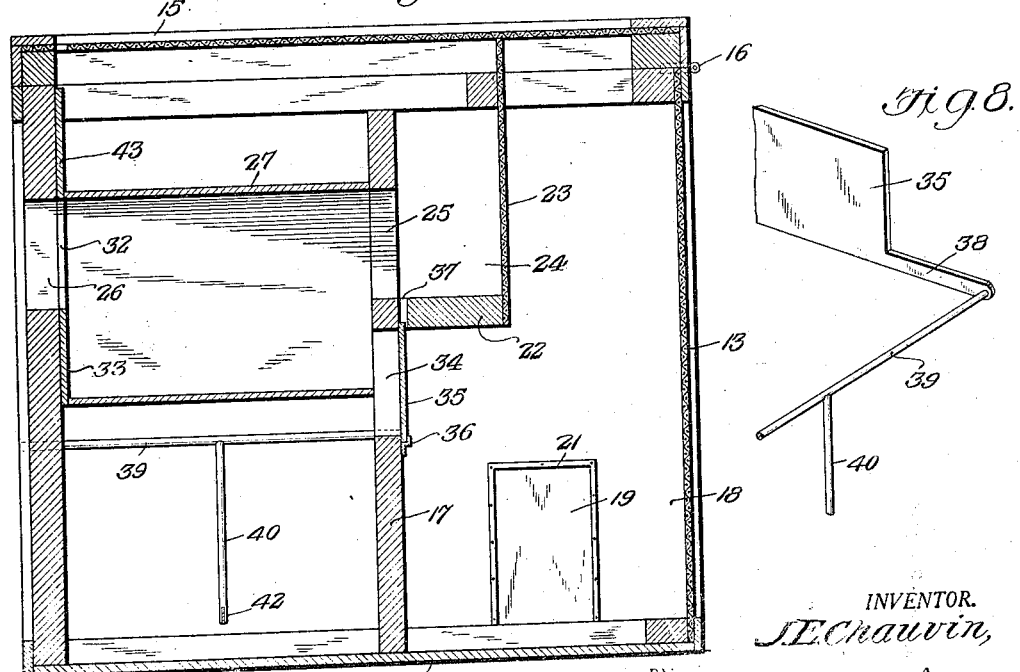
INVENTOR.
J. E. Chauvin,
BY
Wilkinson & Ginsta
ATTORNEYS.

Sept. 9, 1924.  
J. E. CHAUVIN  
ANIMAL TRAP  
Filed Aug. 20, 1923

Inventor  
J.E.Chauvin,

By Wilkinson & Giusta  
Attorney

Patented Sept. 9, 1924.

1,508,217

UNITED STATES PATENT OFFICE.

JUSTIN E. CHAUVIN, OF MONTEGUT, LOUISIANA.

ANIMAL TRAP.

Application filed August 20, 1923. Serial No. 658,392.

*To all whom it may concern:*

Be it known that I, JUSTIN E. CHAUVIN, a citizen of the United States, residing at Montegut, in the parish of Terrebonne and State of Louisiana, have invented certain new and useful Improvements in Animal Traps; and I do hereby declare the following to be a full, clear, and exact description of the invention, such as will enable others skilled in the art to which it appertains to make and use the same.

The present invention relates to improvements in animal traps in which provision is made for automatically trapping rats, mice and other small animals, the trap being constantly in a "set" position and being automatically restored to the "set" position after the animal has been trapped in the cage.

An object of the invention is to provide a compact and effective trap for catching large numbers of small animals and for preventing the animals from effecting escape once they are caught.

Other objects of the invention are to provide a trap of few parts operating in a simple mechanical manner in which the bait is attractively presented to the animal but is so located as to be inaccessible; to provide a simple construction in which access may be readily had to the animals caught in the trap, to the bait receptacle and to the several moving parts.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of an animal trap constructed according to the present invention.

Figure 2 is a longitudinal section taken therethrough.

Figure 3 is a transverse section taken through the trap,

Figure 6 is a perspective view of one of the boxes.

Figure 7 is a section taken through the escape gate and

Figure 8 is a fragmentary perspective view showing one of the doors and its mounting.

Figure 4:
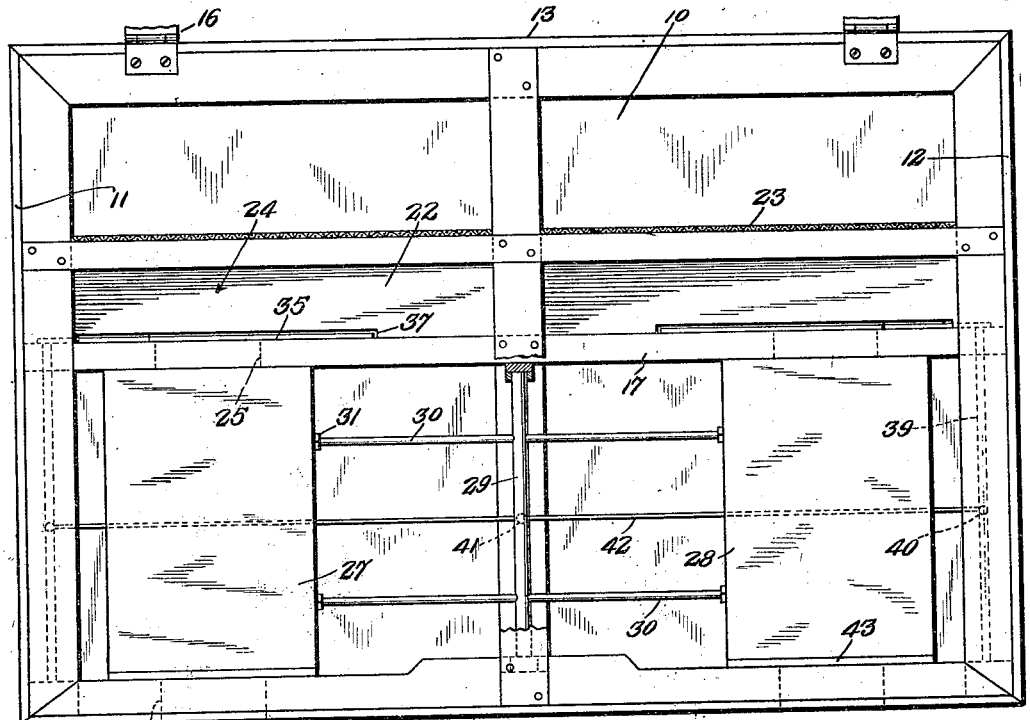
Figure 4 is a plan view of the trap with the lid removed.

Referring more particularly to the drawings the trap is composed of a base 10 end walls 11 and 12 the rear wall 13 and the front wall 14. This base and the walls are assembled together as a box and the construction is preferably of wire mesh or screen with a frame of wood work about it. A lid 15 encloses the top portion of the box, such lid being hinged as indicated at 16 to the rear wall 13 and being secured in place by its weight or by a pad lock or other appropriate means.

Within the box is a longitudinal central wall or partition 17 dividing the box and providing in the rear portion a cage 18 where the animals are finally confined. A sliding gate 19 is provided in the end wall 11 in order to remove the imprisoned animals from time to time. The gate 19 is mounted for vertical sliding movement in substantially Z-shaped clips 20 secured to the end wall 11 in any appropriate manner, such for instance as indicated in Figure 7 in which reinforcing strips 21 are secured to the inside face of the wire about the opening which is cut in the wire to provide the door aperture. The cage 18 is also accessible through the top when the cover 15 is lifted. The partition 17 supports in conjunction with the end walls a platform 22 for the bait. A mesh or other wall 23 is secured at its lower end to the rear edge of the platform 22 and this wall extends up to the top portion of the box or to the lid 15. A bait chamber 24 is thus provided intermediately of the box and at an elevation above the cage 18. This bait chamber is provided with two apertures 25 which are made through the partition 17 above the platform 22. The apertures 25 are in alinement with similar apertures 26 made in the front wall 14.

Figure 5:
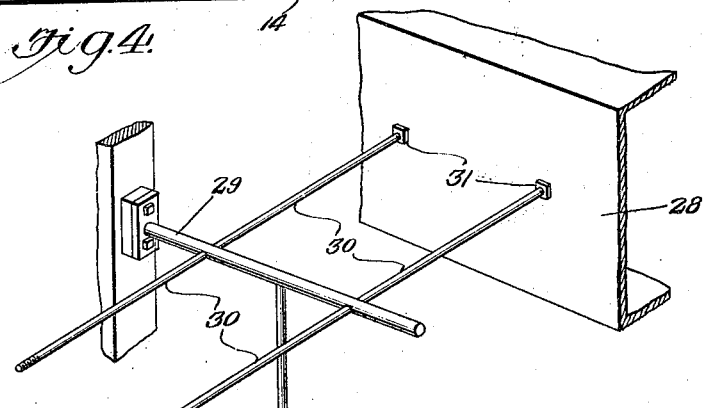
Figure 5 is a fragmentary perspective view showing a detail of the moving parts.

Between the front wall and the partition 17 are a pair of boxes 27 and 28 balanced upon a rod 29 by the use of arms 30 which extend between the rod 29 and the boxes. The ends of the rods may be threaded as indicated in Figures 2 and 5 and nuts 31 may be employed for securing the boxes in place. These boxes are cube or other shape and they are provided with openings 32 in their front walls 33, the openings being made at the upper parts of the walls and the opening agreeing in size and shape with the aperture 26 in the front wall so as to permit an animal to enter the box when the same is in the raised position. The rear walls of the boxes are removed in order to permit the animal to see the bait in the chamber 24 and also to permit the animal to escape when the box descends through the openings 34 in the partition 17 beneath the platform 22. There are also two openings 34 substantially beneath the openings 25.

These openings 34 are normally closed by doors 35 which seat at their lower ends in clips 36 and which move upwardly through slots 37 in the platform 22. The movement is guided in this manner and the doors 35 thus move upwardly and mask the openings 25 so as to exclude the animal from the bait chamber.

The doors 35 are provided with arms 38 secured to shafts 39 journaled in the front wall and in the partition 17. The shafts 39 have depending arms 40 which are connected to a depending arm 41 upon the central rod 29 by the use of flat and flexible springs 42.

In use, cheese or other bait is placed in the bait chamber 24 as when the lid 15 is lifted. An animal approaching the trap and lured by the bait will be able to see the same through the openings 25, 26 and 32 and directly through the boxes which are normally in the full line position indicated in Figure 2 by reason of a condition of balance. The animal in entering for the bait will be caught in one of the boxes which will immediately destroy the condition of balance and the box containing the animal will swing down for instance as shown in Figure 2 where the box 28 is in the lowered position. As the box is lowered, the central arm 41 will be swung to one side thus pulling upon the flat spring 42, the depending arm 40 and rotating the respective shaft 39 whereby to elevate the door 35 which partakes of a pivotal or swinging movement. The dotted line position of this door is indicated in Figure 2, the door being raised to close the opening 25 and thus prevent the animal from quickly making its escape into the bait chamber. The door also opening the lower opening 34 through which the animal is led to escape into the cage 18. As soon as the animal leaves the box, the condition of balance will be restored and the box will ascend thus closing the door 35 and the animal will be effectively trapped. It will be noted that the flat spring 42 on the opposite side simply flexes and has no effect on the opposite door.

Each box is provided with a flange 43 forming an extension of its front wall which flange passes in front of the opening 26 when the box is in the lowered position and prevents the animal from getting into the box when it is in the lowered position. The boxes will work alternately and these boxes will be restored to position as soon as the animal is caught so that the operation of the trap is a continuous one and the cage will hold many animals which may be removed from time to time.

It is obvious that various changes and modifications may be made in the details of construction and design of the above specifically described embodiment of this invention without departing from the spirit thereof, such changes and modifications being restricted only by the scope of the following claims.

What is claimed is:—

1. A trap comprising a pair of pivotally mounted boxes balancing one another and adapted to swing down in opposite directions on the entrance thereto of an animal, a bait chamber normally communicating with the boxes, a cage placed at a lower level for communicating with the boxes on the lowering thereof, a door mounted in conjunction with each box and adapted to normally shut off the communication between the box and the cage but adapted to lift when the cage lowers and shut off the communication between the cage and the bait chamber and means connected between the cage and the doors for lifting one door only when its respective cage is lowered without affecting the movement of the other door.

2. A cage comprising an enclosure having a front wall with animal receiving apertures, a pair of boxes having openings registering normally with the apertures in the enclosure, a bait chamber in the enclosure in alinement with said apertures and having communication with the boxes, a cage in the enclosure also adapted to have communication with the boxes, means for supporting said boxes for balanced pivotal movement, and doors associated with said box supporting means for normally closing the communication between the boxes and the cage and for closing the communication between the boxes and the bait chambers when the boxes are lowered.

3. A trap comprising an enclosure, a lid therefor, a cage in the enclosure accessible through the lid, a bait chamber also in the enclosure and being accessible through the lid, a pair of balanced pivoted boxes in the enclosure being accessible to the exterior and communicating with the bait chamber, and doors associated with the boxes for closing the communication between the boxes and the cage and also for controlling the communication between the boxes and the bait chamber.

4. A trap comprising an enclosure, a partition therein providing a cage at one side and a bait chamber cut off from the cage, a pair of balanced boxes supported at the other side of the partition and being accessible to the animals from the outside, said boxes being also in normally open communication with the bait chamber, and doors for opening and closing the communication between the boxes and bait chamber and also adapted to open the communication between the boxes and the cage when the boxes are lowered.

5. A trap comprising a pair of boxes, a rod supporting the boxes for balanced movement, an arm connected to said rod, pivotally mounted doors associated with said boxes, arms for moving the doors individually, flat springs secured between the first mentioned arm and the door arms, a bait chamber normally communicating with the boxes when in the raised position, and a cage normally cut off by said doors from the boxes.

6. A trap comprising an enclosure, a partition therein providing a cage at the rear side, a platform in this rear side for supporting bait and being cut off from the cage, said partition having openings above and below said platform and having slots in the platform, doors pivotally mounted beneath said platform and adapted to normally close the lower openings but moving up through said slots to close the upper openings when raised, pivotally mounted balanced boxes in front of said partition having their rear ends removed and provided with openings in their front upper walls, flanges extending above the front portions of the boxes, said enclosure having apertures in front of the boxes, and yieldable coupling means between said boxes and the doors.

JUSTIN E. CHAUVIN.